UNITED STATES PATENT OFFICE.

ÁRPÁD RÓNAY, OF BERLIN, GERMANY, ASSIGNOR, BY MESNE ASSIGNMENTS, TO GENERAL BRIQUETTING CO., OF NEW YORK, N. Y., A CORPORATION OF MAINE.

PROCESS OF PRELIMINARILY TREATING MINERAL AND METALLIC SUBSTANCES WHICH ARE TO BE UNITED BY PRESSURE.

1,087,183. Specification of Letters Patent. Patented Feb. 17, 1914.

No Drawing. Application filed May 20, 1910. Serial No. 562,435.

*To all whom it may concern:*

Be it known that I, ÁRPÁD RÓNAY, a subject of the King of Hungary, and residing at Berlin, Germany, have invented a certain new and useful Improved Process of Preliminarily Treating Mineral and Metallic Substances Which are to be United by Pressure, of which the following is a specification.

My invention relates to a process of giving mineral and metallic substances which are to be united by pressure a preliminary treatment with steam, which treatment immediately precedes the introduction of the material into the press, so that as the press is closed, it will still be steam and not water which is occluded among the metallic particles.

The process is particularly applicable to the treatment of substances which are capable of being bound when pressed and which undergo a cementing process when they have been pressed.

The essential feature of this invention is that hot steam shall be introduced into the mass of particles to be pressed at that period of time which precedes the pressing operation.

The general process of briqueting and the machinery excellently adapted for that purpose is now well known, being described in my United States Letters Patent, Reissue No. 12643, reissued April 30, 1907. The process generally speaking is based upon the conception that in order properly to unite metallic or other particles, it is necessary to drive out the air between the particles so that they are capable of coming into intimate contact with each other and of cohering as a solid mass when pressure is applied. The materials or substances which may be advantageously subjected to my process are for instance, flue dust, ores, coal dust, metal filings or shavings or combinations of such materials and in general the same class of materials which are treated in my various issued Letters Patent.

It is already known that advantageous results will flow from the use of the briqueting process mentioned if the mineral or metal particles are moistened with water, but the weight of water resulting in its uneven distribution through the metal particles and the fact that it is not a compressible substance, to a certain extent counteracts the valuable properties which are expected from the employment of water. I have now discovered that if the metal particles as they reach the press are associated with steam, not water, I not only obtain the valuable results which the use of moisture is expected to carry with it, but certain new and unexpected results which are of special value in connection with a briqueting process of this type; for instance, the steam will be uniformly distributed throughout the mass and occupying, as it does, a relatively enormous amount of space as compared with water, it, to a very great extent, has already from its very nature, displaced the objectionable air which it is the object of the briqueting process to drive out of the metal particles so that the press is relieved of a considerable proportion of its burden for this reason alone. The steam also moistens the particles uniformly throughout, and by the use of it the degree of moisture which is very important, can also be optionally regulated. It is further found that the mass being permeated with steam and the press closed, any part of the moisture not useful to cause adherence between the particles will escape with the air which is driven off. The enormous pressure in the press condenses such part of the steam as is useful in the briqueting operation and this condensation takes place at the point where just that much moisture is desired and not, as when water is used, practically only at the bottom of the briquet. Certain physical and chemical changes which further the briqueting operation are materially promoted and caused by the use of steam as described. Thus the oxidation of the metallic constituents is uniformly and adequately brought about at the places where oxidation is desired and this oxidation is accelerated by the employment of the high temperature which the hot steam contains. The particles are not oxidized or rusted to a considerable extent, as when water is employed, but are rather coated with a minute oxidized surface, this latter being advantageous and the former being, especially where there is much rust, a material defect. When water is used and not forced out of the press by the great pressures employed, the briquet will not hold together and if, on the other hand, the water is forced through the very minute passage intended for the escape of air, the air escape will be blocked and the effect aimed at by the use of such a press will be retarded, if not entirely prevented. When steam is used, there is no chance for the water to escape, except in the form of vapor, and accordingly there is no interference with the proper escape of air, but on the contrary, as already explained, the removal of air is furthered by the initial displacement of the air by the steam. The preliminary treatment with steam as described also favors the formation of colloidal silicates which cause the briquets to harden more rapidly after the pressing operation. Colloidal silicate is a term generally used to describe the condition produced in the silicates when subjected to pressure in the presence of moisture. When such colloidal conditions are created the silicates harden rapidly and act as a cement and not merely as a filler. The creation of this colloidal condition is favored by the above described steam treatment.

The introduction of steam in the fine particles to be briqueted may be said to build up a steam layer about each particle which converts that portion of the iron particle, for instance, with which it is in contact into an iron oxid so that the steam and the pressure working together brings about a wholly unexpected and very valuable and desirable result in the briqueting operation. The steam furthermore heats the material to be briqueted, so that as it enters the press the metallic particles are each expanded, thus by their own physical change of form at this particular time and under these particular conditions displacing an equivalent amount of air.

It is obviously important from the above description that the steam treatment should be of such character and should be so applied that the steam will be effective as steam when the fine particles are in the mold of the press. A preliminary steam treatment, which allows the steam to condense to a material extent before the substances are fed into the mold is manifestly, in view of the above description, not such a steam treatment as I employ. In one mode of employing my process I supply the steam in such manner that before it impacts on the loose material or the fine particles, it is combined with hydro-carbons, for instance, petroleum, oils, tar, tar vapors, etc., so that the steam carries with it particles of these substances or vapors and supplies the same to the material to be pressed. In this manner I obtain the advantage of an increased percentage of carbon in the compressed material. In supplying such hydro-carbons to the fine particles, it is, as with steam alone, important that their application should be directly associated with and should precede by only a short time a briqueting or compressing operation.

I claim:

1. In the process of compressing briquets of mineral or metallic substances that improvement which consists in causing steam to act on the loose substances before the same are pressed in such manner that the particles still contain steam, as steam, when the press is being closed.

2. In the process of compressing briquets of mineral or metallic substances that improvement which consists in causing steam containing a hydro-carbon to act on the loose substances before the same are pressed in such manner that the particles still contain steam, as steam, when the press is being closed.

3. The herein described process of treating mineral or metallic particles which consists in treating the loose particles with steam before the same are introduced into a press and at that period of time which closely precedes the compression of the particles in the press and in such manner that the particles still contain steam, as steam, when the press is being closed, closing the press and then pressing the particles into cohering briquets, substantially as specified.

In testimony whereof, I affix my signature in the presence of two witnesses.

ÁRPÁD RÓNAY.

Witnesses:
 WOLDEMAR HAUPT,
 HENRY HASPER.